(12) United States Patent
Giefer et al.

(10) Patent No.: US 8,413,536 B2
(45) Date of Patent: Apr. 9, 2013

(54) ACTUATING DEVICE FOR SELECTING FIXED GEAR RATIOS OF A GEAR CHANGING TRANSMISSION

(75) Inventors: Andreas Giefer, Lemfoerde (DE); Jorg Meyer, Wagenfeld (DE); Ludger Rake, Steinfeld (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/672,091

(22) PCT Filed: Aug. 6, 2008

(86) PCT No.: PCT/DE2008/050023
§ 371 (c)(1),
(2), (4) Date: Feb. 4, 2010

(87) PCT Pub. No.: WO2009/018823
PCT Pub. Date: Feb. 12, 2009

(65) Prior Publication Data
US 2011/0219901 A1  Sep. 15, 2011

(30) Foreign Application Priority Data
Aug. 9, 2007  (DE) .......................... 10 2007 037 707

(51) Int. Cl.
*B60K 20/00* (2006.01)
*F16H 59/04* (2006.01)
(52) U.S. Cl.
USPC .................... 74/473.3; 74/473.12; 200/61.91
(58) Field of Classification Search .................... 70/248; 74/473.21, 473.3, 473.12; 192/220.2; 477/99; 200/61.91
See application file for complete search history.

(56) References Cited

U.S. PATENT DOCUMENTS

| | | | |
|---|---|---|---|
| 5,014,038 A * | 5/1991 | Leigh-Monstevens et al. | 340/430 |
| 5,884,528 A * | 3/1999 | Ludanek et al. | 74/473.3 |
| 6,881,175 B2 | 4/2005 | Loibl | |
| 6,904,822 B2 * | 6/2005 | Meyer et al. | 74/335 |
| 7,028,575 B2 * | 4/2006 | Ehrmaier et al. | 74/473.18 |

(Continued)

FOREIGN PATENT DOCUMENTS

| DE | 199 61 375 A1 | 6/2001 |
|---|---|---|
| DE | 100 28 350 A1 | 12/2001 |

(Continued)

*Primary Examiner* — Troy Chambers
*Assistant Examiner* — Alexander Vu
(74) *Attorney, Agent, or Firm* — Davis & Bujold, PLLC

(57) ABSTRACT

An actuating device for selection on shift steps of a gear changing transmission. The actuating device comprises a flexible gear selection device (1) with at least two drive step positions, a park lock position and an additional park lock-actuating device (4) for activation of the park lock. When the gear selector device (1) moves out of the park lock position, the gear selector device (1) becomes disengaged while movement of the gear selector device (1) from one of the drive step positions into the park lock position, or beyond the previous park lock position, does not engage the park lock. Engagement of the park lock is only achieved by actuating the additional park lock-actuating device (4). This improves the safety and provides intuitive shifting between the different drive step positions without the need to view the gear selector device. The unintended engagement of the park lock is precluded.

20 Claims, 4 Drawing Sheets

U.S. PATENT DOCUMENTS

| | | | |
|---|---|---|---|
| 7,300,276 B2 * | 11/2007 | Sun | 431/153 |
| 7,530,285 B2 * | 5/2009 | Rettenmaier et al. | 74/473.18 |
| 7,971,498 B2 * | 7/2011 | Meyer et al. | 74/10.41 |
| 2004/0025613 A1 | 2/2004 | Meyer et al. | |
| 2004/0226801 A1 * | 11/2004 | De Jonge et al. | 192/220.7 |
| 2007/0261509 A1 * | 11/2007 | Meyer et al. | 74/504 |
| 2008/0115613 A1 | 5/2008 | Giefer et al. | |
| 2009/0000407 A1 | 1/2009 | Meyer et al. | |
| 2011/0219901 A1 * | 9/2011 | Giefer et al. | 74/473.3 |

FOREIGN PATENT DOCUMENTS

| | | |
|---|---|---|
| DE | 100 59 794 A1 | 12/2001 |
| DE | 102 17 614 A1 | 11/2003 |
| DE | 10 2004 041 087 A1 | 3/2006 |
| DE | 10 2004 054 264 A1 | 5/2006 |
| DE | 10 2005 002 086 B3 | 9/2006 |
| DE | 602 13 396 T2 | 11/2006 |
| JP | 05229360 | 9/1993 |
| WO | 2006/074645 A1 | 7/2006 |

\* cited by examiner

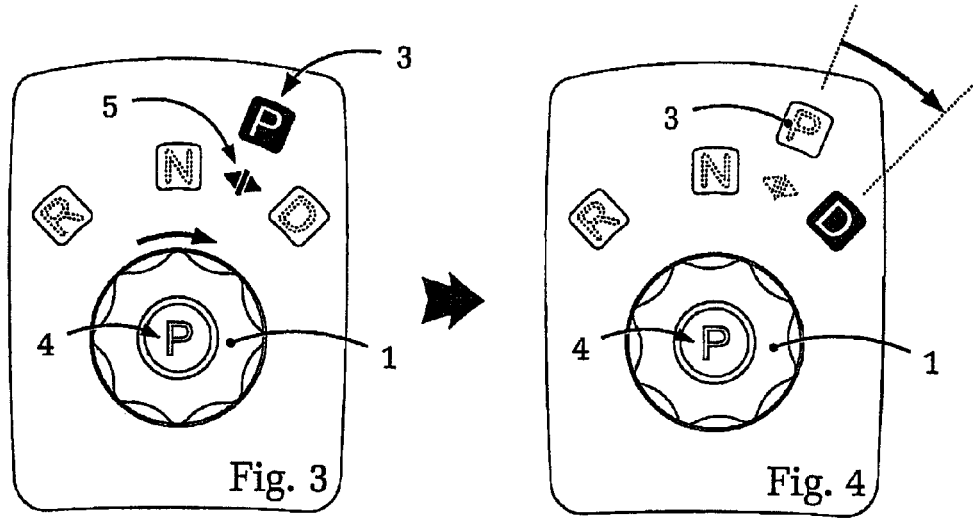
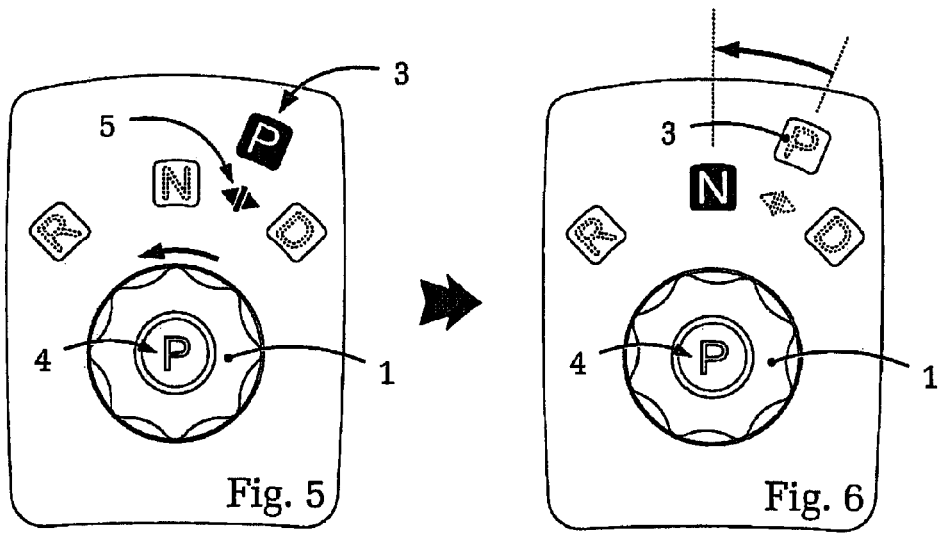
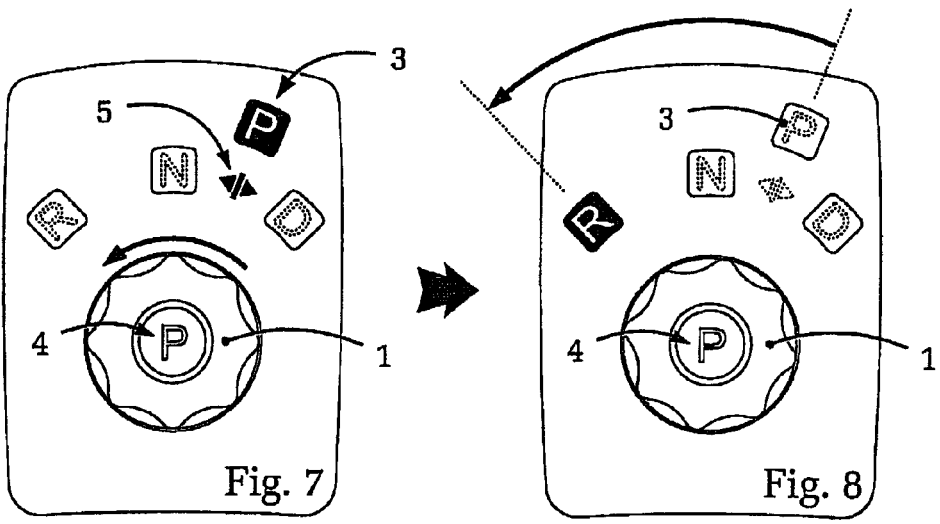
Fig. 3　Fig. 4　Fig. 5　Fig. 6　Fig. 7　Fig. 8

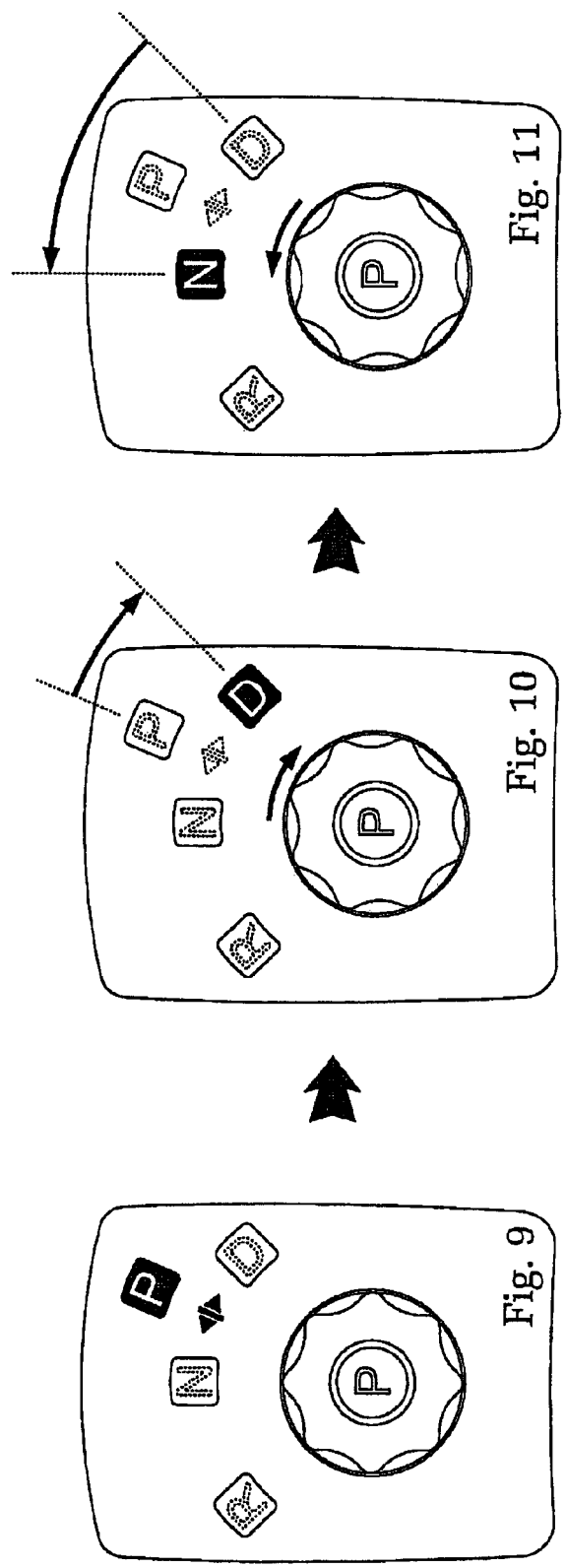

ACTUATING DEVICE FOR SELECTING FIXED GEAR RATIOS OF A GEAR CHANGING TRANSMISSION

This application is a National Stage completion of PCT/DE2008/050023 filed Aug. 6, 2008, which claims priority from German patent application serial no. 10 2007 037 707.1 filed Aug. 9, 2007.

FIELD OF THE INVENTION

The invention relates to an actuating device for selection of shift steps of a gear changing transmission, for example, an automatic transmission with a shift-by-wire operation.

BACKGROUND OF THE INVENTION

Gear changing transmissions for motor vehicles are usually controlled or shifted, respectively, by means of an actuating device within hand-reach of the driver. Regularly, the actuating devices, such as shift lever or selector lever, in these cases are applied and positioned between the front seats or on the center console of the motor vehicle, for instance.

The constructive and ergonomic requirements for these actuating devices, for gear changing transmissions, are diverse. For instance, to suggest to the driver a realistic feeling of the transmission operation, for ergonomic reasons, it is required for this genus of the actuating devices that feedback is provided during the activation, optical as well as a clear haptic or tactical, respectively, about the actual shift condition or operating condition, respectively, of the transmission. It is especially desired to obtain, under all possible conditions, a safe handling of the transmission-actuating device without the need to look at the actuating device.

In the case of the earlier commonly used, strictly mechanical transmission actuation, or in the case of a mechanical link between the actuating device and the gear changing transmission—for instance by means of a cable pull or rods—the position of the selector lever or the actuating device, respectively, and the actual transmission setting always matches because of the mechanical link between the actuating device and the transmission. Also, possible actuating locks in the transmission become noticeable, due to the mechanical transfer, when operating the selector lever or the actuating devices.

With the increasingly applied electro-hydraulic or shift-by-wire actuation, respectively, in gear shifting transmissions, a mechanical link does not exist anymore between the actuating device or the selector lever, inside the passenger compartment, and the transmission in the motor compartment. In fact, the transfer of shift commands of the actuating device to the motor vehicle transmission occur, in a "shift-by-wire" transmission, almost exclusively by means of electric or electronic signals, followed by an electro-hydraulic transformation of the shift commands directly to the transmission.

This applies partially to modern gear changing transmissions, but mainly to the current generations of automatic gear boxes which, today, are mostly completely servo-actuated or electro-hydraulic remote controlled, respectively.

Especially in shift-by-wire-actuated gear changing transmissions, and based on the background of the servo-actuated transmission operation, actuating devices are increasingly being applied which only have a comparable short shift travel and which need little actuating force. Hereby, the haptic feedback, meaning the gear shift status feedback to the user, is basically limited to overcoming the locking of the actuating device. In such actuating devices, however, which only require a short shift travel and shift forces, and which just provide minimal haptic feedback with regard to the shift state, operating errors are possible.

For example, in the case of shifting through several transmission steps, not locked in the actual vehicle state, like shifting back and forth between the drive step "D" and "R", shifting through and beyond the neutral position "N", it might inadvertently occur that the actuating device is shifted beyond the drive step "R", whereby the park lock will unintendedly become engaged.

This situation can occur, for instance, when parking or maneuvering at low speed or when swinging the vehicle when stuck in snow. In these cases, often a rapid shifting between the forward gear and reverse gear occurs and attention, at the same time, is focused towards the road. Therefore, the operation of the gear selector device occurs in a haptic mode, not viewing the gear selector device.

In this example and at low speed of the vehicle, in vehicles having a conventional shift scheme layout, the reverse gear and the park lock are not blocked and it can happen that the actual shift moves beyond the drive position "R". This will cause—at least at low speed—the park lock to engage and, therefore, maneuvering is unintentionally, and by surprise, interrupted.

SUMMARY OF THE INVENTION

Based on this background, it is the task of this invention to create an actuating device, for the servo-actuated operation of a gear change transmission, which will overcome the mentioned disadvantages of the state of the technology art. The actuating device will especially allow, under several different boundary conditions, an always safe and haptic-intuitive transmission operation, without the need to keep an eye on the transmission-actuating device.

First, and by itself and in a known manner, the actuating device and in accordance with the present invention, comprises a gear selector device movable, between at least two drive positions and a park lock position, to select transmission drive steps.

According to this invention, the actuating device is characterized by an additional park lock device for activating the park lock. Hereby, the gear selector device of the actuating device is designed so that the park lock becomes disengaged when the gear selector device is shifted out of the park lock position while, at the same time, when moving or during an attempted moving of the gear selector device, from one of the drive step positions into the previous park lock position of the gear selector device or beyond the previous park lock position of the gear selector device, in the opposite case, the park lock is not engaged.

That means, in other words, that engagement of the park lock can only occur by means of actuating the additional park lock-actuating device, but not by actuating the gear selector device. For that reason, an unintentional engagement of the park lock, when moving the gear selector device, is absolutely excluded.

As usual, however, the engaged park lock can be conventionally disengaged by shifting the gear selection device from the present park lock position, still existing at the gear selector device, into one of the drive step positions.

Thus, an intuitive shifting between several drive step positions is guaranteed, without viewing the gear selector device, and the described unintentional shifting, beyond the desired drive step as in the state of the art and the related unintentional engagement of the park lock, is completely excluded.

When maneuvering the vehicle or breaking the vehicle free through swinging back and forth, with the required rapid shift changes, between drive step "R" and "D", it is possible, according to the invention, to shift the gear selector device simply back and forth between the two end stops, without any unintentional engagement of the park lock. The driver's attention, therefore, can be completely devoted to the road or the maneuvering, respectively, without the need to keep an eye on the gear selector device. In this invention, the positioning of the park lock-shift position for the gear selector device is independent from where it resides within the shift scheme or shift angle area, respectively. If necessary, the park lock-shift position can, as in the state of the art positioning be located, definitely at one end of the shift scheme, adjacent the reverse shift position "R".

In accordance with the preferred embodiment of the invention, the park lock is, however, positioned within the shift angle area of the other shift positions of the gear selector device.

For instance, the park lock position of the gear selector device can be located between two drive step position, especially between the drive step position "N" and "D". Hereby, the first advantage is short shift travel—with the engaged park lock—shifting from the park lock position selectively into one of the two selectable drive step positions "N" or "D". In comparison to the state of the art, in which the park lock position is usually positioned outside of the area of the drive step positions, one first has to shift through the reverse gear drive position, when shifting from the park lock position into the drive position "N" or "D", resulting in long shift travel which is detrimental in regard to ergonomics and an intuitive activation. Further, it is not required to block the park lock-shift position through actuation, as soon as the park lock became disengaged, in this configuration of the park lock shift position within the shift angle range of the other shift positions. Actually, in this case, it is sufficient to just logically eliminate the park lock-shift position from the shift scheme, meaning just to ignore any motion of the gear selector device in the control electronics.

Also, another embodiment is possible in which the park lock position, in the shift scheme, is located in the same place as the other drive step positions. In other words, it means that one of the drive step positions in the shift scheme is occupied twice. Hereby—with an engaged park lock—the corresponding position of the shift scheme does not signal a drive step position, but a park lock position. In this case, whether the park lock is engaged or whether the drive step, located at the same place in the shift scheme, is engaged it is clearly symbolized by the drive step display. In this case and with an engaged park lock, it is possible to shift, by means of the gear selector device, directly out of the park lock position either into the drive step "R" or the drive step "D". When shifting back from either "R" or "D", into the previous park lock position, the park lock does not engage and is visualized at the gear display but, instead, the neutral position "N".

In principle, the invention can be applied to all common configurations of actuating devices or gear selector devices, respectively. Based on this background, and in accordance with an embodiment of this invention, it is first provided that the gear selector device of the actuating device is designed as a defined-multistable.

Due to this embodiment, the invention can be applied in a general conventional gear selector device with several solid lock positions, in which each of the lock positions is an assigned drive position. This is the case, for instance, with a conventional automatic selector lever.

To underline the fact that the park lock, in accordance with this invention, is not being engaged anymore by motion of the selector lever (but via the additional park lock-actuation device), the gear display at the selector lever needs to be designed, in this case, so that the display position "park lock", for disengaged park lock, is hidden. Also, this inventive application preferably requires an actuating device, located on a conventional multi-stable selector lever, which moves the selector lever, when engaging the park lock, actuated into the park lock position, so that in an engaged park lock position—be it manually or automatic through Auto-P—the position of the selector lever again matches the engaged drive step in the transmission. Optionally, the park lock position can be double occupied, as mentioned above, with the neutral position and the reverse gear step.

In accordance with an alternative embodiment of the invention, the gear selector device is designed as monostable. A monostable designed gear selector device, for instance, an automatic-selector lever which spring-loaded and returns after each actuation back to the center position, initially has the advantage that no actuating device is necessary to match actuatorically, for the different cases, the selector lever position with the actually engaged drive step. The latter is, in the case of a defined-multistable gear selector device—i.e., with a conventional selector lever—especially required when automatically engaging the park lock through Auto-P so that the selector lever position matches, also in the case of Auto-P, again the transmission condition.

In a monostable gear selector device, however, only the gear display at the selector lever, or in the dash board, needs to be accordingly tracked or modified, respectively, to match the transmission condition with the actuating device. Because of that reason, actuating devices having a monstable designed gear selector device are initially suitable for the application in connection with the invention. Because in monstable gear selector devices or selector levers already possess a variable display of the transmission shift steps, at the selector lever or in the dash board, and can be designed in a way that the corresponding display position for the park lock position is eliminated from the shift scheme or hidden, respectively, as soon as the park lock has been released via actuating the gear selector device or selector lever, respectively.

If, on the other hand, the park lock again is engaged, via actuation of the invented additional park lock-actuation device—or perhaps automatically via the Auto-P function—the gear display of the actuating unit can also be triggered in a way so that the display position, corresponding with the park lock position, is again activated and displayed. In addition, with a monostable gear selector device or a selector lever—by itself and known in the art—also an actuatorically adjustable end stop can be provided to limit, depending on the drive step and depending on other condition factors of the motor vehicle (like ignition ON, motor running, speed of the vehicle), the actuating range of the selector lever so that selection of the currently non-permitted shift steps is not only prevented but also signaled to the driver in a haptic mode by the actuating device.

In accordance with another, especially preferred embodiment of this invention, the gear selector device of the actuating device is designed as an indifferent-multistable, hereby preferably and in its own as an unlimited rotatable rotary knob.

An indifferent-multistable gear selector device—meaning a rotation symmetric rotary knob without any position pointer, is initially different from a monostable gear selection device—for instance from an automatic-selector lever which is spring loaded and returns to the center position each time after actuation—because the indifferent-multistable gear selector device does not return to a certain stable position. In fact, the indifferent-multistable gear selector device remains each time in that position in which it was shifted during the actuation, initially like a defined-multistable gear selector device, for instance, like a conventional selector lever or also a rotary knob with a position pointer.

In addition, the indifferent-multistable gear selector device differs from a defined-multistable gear selector device (for instance, the conventional selector lever) also by the fact that the individual positions of the indifferent-multistable gear selector device do not initially possess a defined shift position or a shift step.

An important example for an application of an indifferent-multistable gear selector device is the previously mentioned, in essence the rotation symmetric rotary knob without any position pointer. When using such a rotary knob as a gear selector device for controlling a gear changing transmission, no certain shift position or drive position is initially assigned to a specific angle position of the rotary knob. In fact, when actuating the rotary knob to a certain rotary angle, the achieved shift position or drive step, respectively, is always related to a difference of the previously engaged shift position or drive step, but also in connection when having an indifferent-multistable gear selector device, always requiring an active gear display.

Hereby, the indifferent-multistable actuating device—for example the mentioned rotary knob—has a distinct advantage that herewith a gear selector device, having discrete and stable shift steps can be realized, however, the difference to the defined-multistable actuating device (i.e., a conventional selector lever) is that no actuatoric tracking of the gear selector device is necessary, in case of a change of the system or transmission state, respectively, not caused by the gear selector device. In the example of the mentioned rotary knob for an indifferent-multistable actuating device, it is just required to track the display of the shift condition (and maybe the locking or the end stops) to achieve, at any time, a match between the transmission state and the shift position of the gear selector device or to maintain the match, respectively.

Considering this background, an additional, preferred embodiment of the invention provides that the actuating device has an actuatorically adjustable stop for limiting the rotary angle of the rotary knob.

Through it, and by means of a rotary knob without a pointer, the complete function and handling of a conventional multistable actuating device, like for instance a toggle switch or a selector lever, can be reproduced in which, for each shift position, a constantly defined operating condition has been assigned for the system to be controlled and in which, for both rotation and shift directions, optical as well as mechanically defined shift end positions or end locks, respectively, are provided.

To implement it in this embodiment of the invention, a variable end stop for the rotary knob is provided by means of an actuatorically adjustable stop device, preferably for both directions. It means that the end stop, or both end stops, respectively—independent from the absolute rotation angle position of the rotary knob—can always be actuatorically set or positioned in a way which corresponds with the current logical shift position of the rotary knob.

For instance, the rotary knob might have last been left by the operator in the shift position "D", when the vehicle was left or the reason why the vehicle, by itself, engaged the park lock through Auto-P. Due to the actuatorically positioned end stops, for the limiting of the rotation angle of the rotary knob, the end stops of the rotary knob can be newly set actuatorically, in this case, so that the driver obtains a match, during the next actuation of the rotary knob, with the engaged park lock, of the new rotary angle range, all the way to the end stops of the rotary knob.

Due to this embodiment, the user hereby always obtains—because of the noticeable end stops—an intuitive shift actuation with no need to watch the rotary knob.

Through the actuatorically adjustable end stops, a rotary motion of the rotary knob can also be completely blocked so that herewith especially safety functions, such as the shift-lock barrier, can be emulated. Hereby, the rotary knob is blocked, via the actuatorically adjustable end stops—for instance in the park lock position or in the neutral position—as long as the driver activates the brake pedal and, therefore, disables the shift-lock barrier.

Such actuatorically variable end stops for a rotary knob are, by itself, known to the applicant in the art, especially from the patent publication DE 10 2005 002 086 B3, the teaching of which are incorporated by reference, but not again described in detail.

The invention altogether is implemented, independent from where the additional park lock device is positioned. For instance, the additional park lock device can be positioned at the dash board or in the center console, i.e., in a logical connection or proximity of the actuating device for an auxiliary brake.

However, in accordance with a preferred embodiment of the invention, it is intended that the additional park lock-actuating device is positioned centered on the front-end of the rotary knob of the transmission actuation device. Hereby, the familiar connection between the gear selector device and the park lock actuation is maintained, but still the invented logic separation of the park lock, from the shift scheme at the gear selector device, is made clear.

Finally, another embodiment of the invention provides that the additional park lock-actuating device is also designed for an actuatoric actuation of an auxiliary brake. Hereby, the result is an advantageous integration of the function of the park lock and auxiliary brake, therefore, an additional contribution towards safety and ease of use. During each engagement of the park lock, the auxiliary brake can be activated as well completely protecting the vehicle from rolling away. The usual move on the hand brake or the actuating device for the auxiliary brake, respectively, can therefore be eliminated when turning off the vehicle.

The invention also relates to an actuating device for selecting shift steps of a gear changing transmission having a flexible gear selector device, between at least two drive step positions, and a gear display device for displaying the selected drive step. Hereby, the actuating device comprises a position adjustable park lock-actuating device, independent from the gear selecting device, for activating the park lock whereby the gear selector device is designed in a way so that a change in its position, with an engaged park lock, leads to the output of a shift command for deactivating the park lock.

In a preferred embodiment of the invention, the park lock has an assigned park lock display which is integrated with the gear display device.

The gear selector device preferably comprises a rotary switch. The rotary switch can be rotated into discrete lock positions, exceeding and going beyond the determined gear selector positions. As an alternative, an option exists that the rotary switch just has a limited number of lock positions and that the rotary motion is limited by stops.

In another embodiment of the invention, the park lock display is integrated into the gear display device between the positions "N" and "D". The park lock display can, in a functional embodiment of the invention, show the available gear selector positions.

In addition, another embodiment of the invention provides the option to position the park lock-actuating device either in, at, or on the gear selection device.

BRIEF DESCRIPTION OF THE DRAWINGS

In the following, the embodiments of this invention are presented through drawings. Hereby shows:

FIG. 3 is a presentation in accordance with FIG. 2 and a view of an actuation device as in FIG. 2, when shifting from the park lock position into the drive step position "D";

FIG. 4 is a presentation, as in FIGS. 2 and 3 and the view of the actuating device in accordance with FIGS. 2 and 3, after shifting into the drive step position "D";

FIG. 5 is a presentation, as in FIGS. 2 and 4 and the view of the actuating device in accordance with FIGS. 2 and 4, when shifting from the park lock position into the neutral position "N";

FIG. 6 is a presentation, as in FIGS. 2 and 5 and the view of the actuating device in accordance with FIGS. 2 and 5, after shifting into the neutral position "N";

FIG. 7 is a presentation, as in FIGS. 2 and 6 and the view of the actuating device in accordance with FIGS. 2 and 6, when shifting from the park lock position into the drive position "R";

FIG. 8 is a presentation, as in FIGS. 2 and 7 and the view of the actuating device in accordance with FIGS. 2 and 7, after shifting into the drive position "R";

FIG. 9 is a presentation, as in FIGS. 2 and 8 and the view of the actuating device in accordance with FIGS. 2 and 8, before shifting from the park lock position into the drive step position "D";

FIG. 10 is a presentation, as in FIGS. 2 and 9 and the view of the actuating device in accordance with FIGS. 2 and 9, after shifting from the park lock position into the into the drive step position "D'" and FIG. 11 is a presentation, as in FIGS. 2 and 10 and the view of the actuating device in accordance with FIGS. 2 and 10, while shifting from the drive step position "D" into the drive step position "N".

DETAILED DESCRIPTION OF THE PREFERRED EMBODIMENTS

Figure 1:
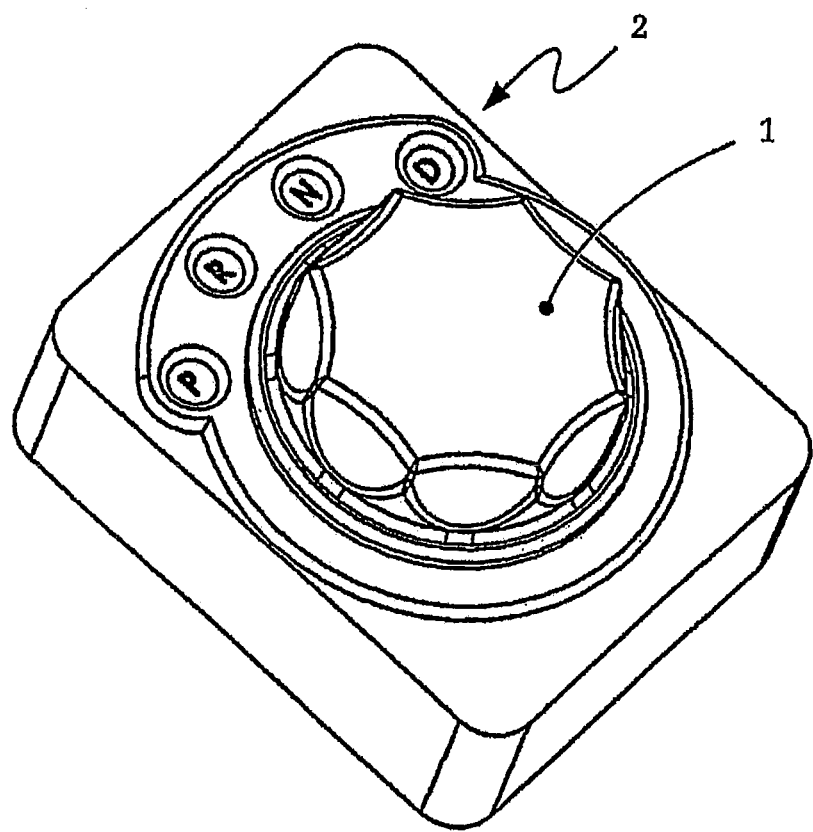
FIG. 1 is a schematic, isometric presentation of an actuating device for a gearbox in accordance with the state of the art.

FIG. 1 is the schematic, isometric presentation of an actuating device for an actuating controlled automatic transmission of a motor vehicle. This operating device, for example mounted on the center console of the vehicle, essentially has a rotation symmetric rotary knob 1, without any pointer, as well as a gear display unit 2 for visualization of the engaged drive step. The rotary knob is configured, by itself, as an unlimited rotatable indifferent-multi stable gear selector part.

That implies that, in the first instance, no determined connection exists between the rotation angle position of the rotary knob 1 and the shift condition of the automatic transmission or the engage drive step of the transmission. However, the connection between the rotary angle position of the rotary knob 1 and the shift state in the automatic transmission is established, first of all, through the control electronic of the actuating device, whereby the gear display device 2 is triggered in a logic correlation with the actual operation of the rotary knob 1 as well as the actual shift state of the automatic transmission.

In addition, in accordance with FIG. 1, the actuating device has end stop for variable limitations of the available rotation angle of the rotary knob 1. The variable end stops ensure that the rotary knob—independent of its absolute rotation angle position—can only be rotated so far as the current drive step is displayed on the gear display device 2 and also correlates with the engaged gear of the transmission or the permitted drive step, respectively.

That means, in other words, that the end stops of the rotary knob 1 can be re-set by the control electronic of the actuation device, when changes occur of the system state, a change in the transmission drive step (regardless whether the changes have been initiated by the driver or happened automatically, like through auto-P) or also at a new system state so that, in each case, the rotary knob can only be rotated within the current permitted drive step range.

The presented actuation device, as in FIG. 1 however, has the above mentioned state of the art disadvantages. Especially for a rapid back and forth switching between the forward drive step "D" and the reverse drive step "R"—while the driver views the road—it can occur that one unintentionally switches, beyond the reverse drive step "R", and hereby inadvertently activates the park lock barrier.

Figure 2:
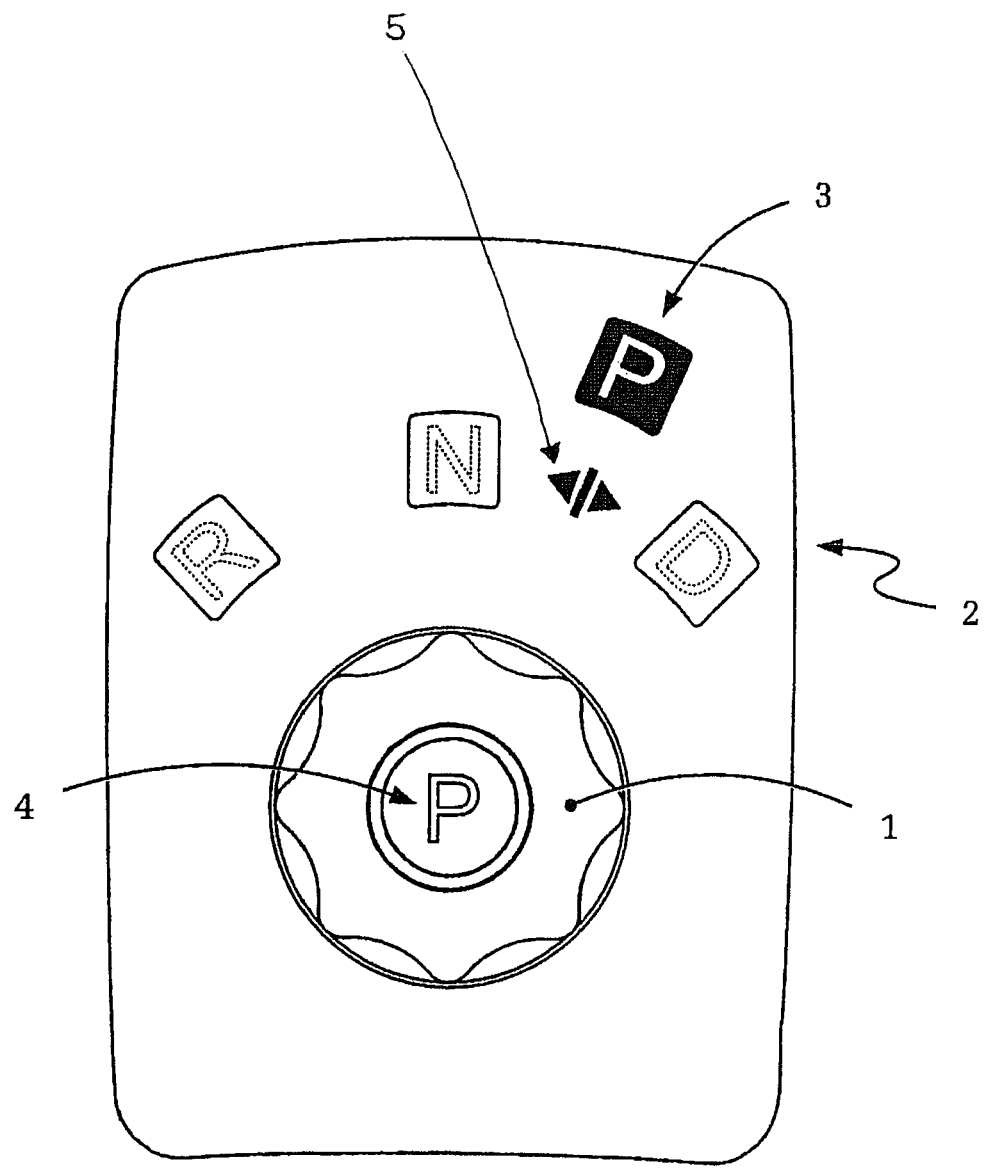
FIG. 2 is, in a schematic top view presentation, an embodiment of an actuation device in accordance with the invention.

Hereby, the actual drive maneuver is unexpectedly interrupted and the vehicle abruptly stops, which is not desired at all. FIG. 2 shows, in a top view as a difference hereto, an actuation device in accordance with the present invention.

Firstly, the actuation unit, in accordance with FIG. 2, shows a pointer-less rotary knob 1 and a gear display device 2. In accordance with FIG. 1, the same as with the state of the art actuation device, the rotary knob is designed, as with the presently invented actuation device and by itself, as an unlimited rotatable gear selection device. Therefore, the actuation device, as in FIG. 2, again presents an indifferent-multistable gear selection device which has several stable, by itself, not determined transmission states which are assigned absolute angle positions of the gear selector element.

In accordance with FIG. 2, the provided grip troughs, on the rotary knob 1, present just one embodiment example and explain the function of the rotary knob 1 as an actuating element. The rotary knob 1 can also be equipped completely rotation symmetric and just have a handy knurl or rubber overlay, whereby it is made clear to the operator that a certain angle position of the rotary knob 1, by itself, does not have an assigned gear position or a shift step.

As a difference from the actuating device as known in the state of the art, in accordance with FIG. 1, the park lock position is removed from the shift scheme and from the gear display device 2 of the invented actuating device, as in FIG. 2.

There is, however, still an illuminated display 3 present, as part of the shift display device 2, to signal the engaged park lock barrier, if it is actually selected. But the park lock barrier—once released—cannot be reactivated back into the previous park lock position by turning the rotary knob 1. The activation of the park lock can only be exclusively achieved, in this particular embodiment, via the additional push button knob 4 centered on the rotary knob 1.

This means that, in other words—as soon as the park lock gets disengaged—the desired drive steps can easily and intuitively be selected through the rotary knob 1 by turning the rotary knob 1, for instance, between the set end positions "R" and "D", without the risk of switching too far into the park lock position.

If the park lock position needs to be activated again, it will take place simply by pressing the additional park lock actuation knob 4 and completely independent from the currently engaged transmission drive step as well as independently from the rotary angle position of the rotary knob 1. Hereby (and in case it is permissible under the actual drive condition, especially the drive speed), the park lock will be engaged in the transmission, as well as the related illuminated display 3 will be activated, on the actuating device, in accordance with FIG. 2.

In FIGS. 3 to 8, possible actuating sequences are presented as they occur in the application of the actuating device, in accordance with FIG. 2.

Hereby, FIGS. 3 and 4 present the state of the actuating device during shifting or shifting from the park lock position into the drive position "D", respectively. FIGS. 5 and 6 show the state of the actuating device during or after shifting, respectively, from the park lock position into the neutral position "N", and FIGS. 7 and 8 the condition of the actuating device during or after shifting, respectively, from the park lock position into the drive position "R".

Based on FIGS. 3, 5 and 7, one can recognize that an engaged park lock activates just the display 3 or illuminates it, respectively, while the other illuminated displays for "R", "N", and "D" are dimmed or de-activated.

Hereby, the driver first receives a clear signal about the engaged park lock. In addition, in an engaged park lock state and an activated illuminated display 3, a double arrow symbol 5 is displayed informing the driver that the rotary knob 1, for disengaging the park lock and the shift into a drive step, can be rotated to either the left or the right, which is symbolized by the added directional arrow in FIGS. 3, 5 and 7, near the rotary knob 1 (not present in the actuating device). Therefore, starting from the position "P" when the brake pedal is pressed (shift lock function), the driver selects the shift positions "D", "N" or "R".

The result of the herewith required rotary motion of the rotary knob 1, in accordance with FIG. 3, 5 or 7, respectively, is presented in FIG. 4, 6 or 8, respectively. One can recognize that, after actuating the rotary knob 1 and the herewith related engagement of the corresponding drive step "D", "N" or "R", the park lock display 3 as well as the double arrow 5 are deactivated and, instead, the actual drive step, corresponding with the illuminated display, is activated.

The deactivation of the park lock display 3 is, therefore, in synch with the elimination of the shift position "P" from the visualized shift scheme of the display 2 as well as from the logical shift scheme of the actuating device.

Finally, FIGS. 9 and 11 once again show the sequence, when shifting from "P" into "D" (similarly as shown in FIGS. 3 and 4), with the following shift actuation from "D" into "N". In the beginning, the transmission and the actuating device are in the shift state "P" and the corresponding park lock display is activated (FIG. 9).

Thereafter, the driver activates the rotary knob and turns it clockwise by one notch, compare to FIG. 10. Hereby, the park lock disengages in the transmission, the transmission is shifted into drive step "D", the park lock display is turned off and, instead, the display "D" is activated.

If the driver now activates the rotary knob again and turns it counter-clockwise by one notch, compare to FIG. 11, it does not engage the park lock position which was the previous corresponding position of the rotary knob for this rotation angle, see FIG. 9. Instead, this rotary motion of the rotary knob, counter-clockwise from "D" by one notch, engages the neutral position "N", and not the park lock position, because the invention eliminates the park lock position, after the deactivation of the park lock, from the actuating scheme.

Hereby, the rotary knob has—with the park lock engaged—initially four stable shift positions, "P", "R", "N" and "D", which can be selected by rotating the rotary knob 1 to either the right or the left by either one or two positions, respectively. Hereby, the end stops of the rotary knob, in shift position "R" and "D", are each designed as set actuation lock devices.

After the deactivation of the park and after engaging the first drive step "R", "N" or "D", however, the shift position "P" is eliminated from the shift scheme whereby, through rotation of the rotary knob 1, only the three stable positions "R", "N" or "D" can be selected. A repeated engagement of the shift lock is, therefore, only possible by actuating the centered "P" key (or when switching off the vehicle through the Auto-P, respectively).

By this result it becomes clear that the invention creates an actuating device which, in comparison to the state of the art, also offers an especially safe and intuitive shifting between the different drive step positions without viewing the gear selector device. Over-rotation of the desired drive position, which is possible in the state of the art and the unintentional engagement of the park lock, is avoided due to the invention. The driver's attention is, therefore, looking toward the road without the need to keep an eye on the gear selector device.

Hereby, the invention contributes significantly to the improvement in the area of actuating devices for motor vehicle transmissions, in regard to the ergonomics and the operating comfort.

REFERENCE CHARACTER LIST

1 Gear Selector Device, Rotary Knob
2 Gear Display Device
3 Park Lock Display Device
4 Park Lock Key
5 Double Arrow

The invention claimed is:

1. An actuating device for selecting a transmission operating position of a gear change transmission, the actuating device comprising:
a rotatable gear selector device (1) having a park lock position located between at least two transmission operating positions such that when the gear selector device is rotated from a first of the two transmission operating positions to a second of the two transmission operating positions, the gear selector device is rotated by the lock position without activating the lock position; and
a park lock-actuating device (4) for solely activating the park lock;
wherein the gear selector device (1) is designed for generating a shift command for deactivating the park lock, when shifting out of the park lock position by rotation of the gear selector device (1), while the gear selector device (1) is prevented from generating a park lock shift command due to rotation of the gear selector device (1) into or through the park lock position such that the park lock is solely activatable by actuation of the park lock-actuating device.

2. The actuating device according to claim 1, wherein the actuating device further comprises that the park lock position, of the gear selector device (1), is positioned within a shift angle range of the other transmission operating positions.

3. The actuating device according to claim 1, wherein the gear selector device (1) is designed as defined-multistable.

4. The actuating device according to claim 1, wherein the gear selector device (1) of the actuating device is designed as monostable.

5. The actuating device according to claim 1, wherein the gear selector device (1) of the actuating device is designed as indifferent-multistable.

6. The actuating device according to claim 5, wherein the gear selector device (1) is an unlimited rotatable rotary knob.

7. The actuating device according to claim 6, wherein the park lock-actuating device (4) is centered with respect to and positioned on the rotary knob (1).

8. The actuating device according to claim 7, further comprising that the park lock-actuating device (4) actuates a lock brake.

9. The actuating device according to claim 5, wherein the actuating device comprises an actuatoric adjustable stop device for limiting a rotation angle of the rotary knob (1).

10. An actuating device, for selection of a desired transmission operating position of a gear change transmission comprising:
   a gear selection device (1) for selecting the desired transmission operating position solely by rotation of the gear selector device (1), and
   a gear display device (2) for displaying the selected operating position and having a park lock position located between at least two transmission operating positions such that when the gear selector device is rotated from a first of the two transmission operating positions to a second of the two transmission operating positions, the gear selector device is rotated past the lock position without activating the lock position,
   further comprising that the actuating device having a positionable park lock-actuating device (4) for solely activating a gear lock, independently of the gear selector device (1), the gear selector device (1) is designed so that a rotational position change of the gear selector device (1), from an engaged park lock position into another selected operating position, leads to an output of a shift command for deactivation of the park lock, and, thereafter, the gear selector device (1) is prevented from again generating a park lock shift command due to a rotational position change of the gear selector device (1) into or through the park lock position.

11. The actuating device according to claim 10, wherein the park lock position has an assigned park lock display (3), and the park lock display (3) is integrated into the gear display device (2).

12. The actuating device according to claim 10, wherein the gear selector device is a rotary knob (1).

13. The actuating device according to claim 12, wherein the rotary knob (1) is rotatable with respect to the gear display device (2) into discrete notch positions to determine the desired transmission operating position.

14. The actuating device according to claim 12, wherein the rotary knob (1) has a limited number of notch positions and the rotary knob is limited by notches in its rotation.

15. The actuating device according to claim 10, wherein the park lock display (3) is inserted into the gear display device (2) between a "N" position and a "D" position.

16. The actuating device according to claim 10, wherein the park lock display (3) shows availability of possible transmission operating selection positions.

17. The actuating device according to claim 10, wherein the park lock-actuating device (4) is one of positioned in, at and on the gear selection device.

18. An actuating device, for selecting a desired operating position of a gear change transmission, comprising:
   the actuating device being connectable, via control electronics, with the transmission for selecting the desired shift position;
   a gear display device for displaying at least a drive position, a reverse position, a neutral position and a park position of the transmission located between reverse position and the drive position; and
   a gear selection device being supported by and rotatable with respect to the gear display device for selecting the desired operating position of the transmission such that when the gear selector device is rotated from a first of the drive and the reverse operating positions to a second of the drive and the reverse operating positions the gear selector device is rotated by and past the lock position without activating the lock position;
   wherein a park lock-actuating device is supported by the actuating device and a gear lock of the transmission is solely activated by actuation of the park lock-actuating device, and
   the gear lock of the transmission is solely released by rotation of the gear selection device with respect to gear display device.

19. The actuating device according to claim 18, wherein, once the gear lock of the transmission is engaged by actuation of the park lock-actuating device, the park lock-actuating device is released by rotation of the gear selector device, with respect to the gear display device, to one of the drive position, the reverse position and the neutral position.

20. The actuating device according to claim 19, wherein once the gear lock of the transmission is released by rotation of the gear selection device with respect to gear display device, the gear selector device is prevented from engaging the park position of the transmission which is solely activatable by actuation of the park lock-actuating device.

* * * * *

UNITED STATES PATENT AND TRADEMARK OFFICE
CERTIFICATE OF CORRECTION

PATENT NO. : 8,413,536 B2
APPLICATION NO. : 12/672091
DATED : April 9, 2013
INVENTOR(S) : Andreas Giefer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 386 days.

Signed and Sealed this
Thirteenth Day of August, 2013

Teresa Stanek Rea
*Acting Director of the United States Patent and Trademark Office*